United States Patent
Simon et al.

(10) Patent No.: US 10,076,939 B2
(45) Date of Patent: Sep. 18, 2018

(54) SUSPENSION SYSTEMS FOR LATERALLY TILTABLE MULTITRACK VEHICLES

(71) Applicant: FORD GLOBAL TECHNOLOGIES, LLC, Dearborn, MI (US)

(72) Inventors: Marc Simon, Köln (DE); Robert Spahl, Köln (DE); Thomas Gerhards, Niederzier (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/554,410

(22) Filed: Nov. 26, 2014

(65) Prior Publication Data

US 2016/0144680 A1    May 26, 2016

(51) Int. Cl.
| | |
|---|---|
| *B60G 3/20* | (2006.01) |
| *B62D 9/02* | (2006.01) |
| *B62D 9/04* | (2006.01) |
| *B60G 21/055* | (2006.01) |
| *B62K 5/10* | (2013.01) |

(52) U.S. Cl.
CPC .............. *B60G 3/20* (2013.01); *B60G 21/055* (2013.01); *B62D 9/02* (2013.01); *B62D 9/04* (2013.01); *B62K 5/10* (2013.01); *B60G 2300/13* (2013.01); *B60G 2300/45* (2013.01)

(58) Field of Classification Search
CPC ........ B60G 5/06; B60G 3/20; B60G 2200/34; B60G 2200/46; B60G 2300/13; B62D 9/02; B62D 9/04; B62K 5/10
See application file for complete search history.

(56) References Cited

U.S. PATENT DOCUMENTS

| | | |
|---|---|---|
| 2,186,065 A | 1/1940 | Fischer |
| 2,353,503 A | 7/1944 | Rost et al. |
| 2,474,471 A | 6/1949 | Dolan |
| 3,309,097 A | 3/1967 | Fritz |
| 3,417,985 A | 12/1968 | Hannan |
| 3,558,123 A | 1/1971 | Yew |
| 3,572,456 A | 3/1971 | Healy |
| 3,589,700 A | 6/1971 | Ruet |

(Continued)

FOREIGN PATENT DOCUMENTS

| | | |
|---|---|---|
| CN | 1918013 A | 2/2007 |
| DE | 679966 C | 8/1939 |

(Continued)

OTHER PUBLICATIONS

Nlotice of Allowance dated Mar. 19, 2015 for patented U.S. Appl. No. 14/201,550.

(Continued)

*Primary Examiner* — Faye M Fleming
(74) *Attorney, Agent, or Firm* — Jones Robb, PLLC; Frank MacKenzie

(57) ABSTRACT

A laterally tiltable, multitrack vehicle suspension may include first and second steering knuckles. The suspension may also include a first set of control arms connected to the first steering knuckle and a second set of control arms connected to the second steering knuckle. Each of the first and second sets of control arms may include upper and lower control arms. The suspension may further include a spring/damper element acting between the first and second sets of control arms and a balancer system.

23 Claims, 5 Drawing Sheets

(56) References Cited

U.S. PATENT DOCUMENTS

| | | | |
|---|---|---|---|
| 3,733,087 A | 5/1973 | Allison | |
| 3,990,725 A | 11/1976 | Allison | |
| 3,992,036 A | 11/1976 | Allison | |
| 4,273,357 A | 6/1981 | Pashkow | |
| 4,351,410 A | 9/1982 | Townsend | |
| 4,375,293 A | 3/1983 | Solbes | |
| 4,458,918 A | 7/1984 | Rumpel | |
| 4,614,359 A | 9/1986 | Lundin | |
| 4,632,413 A * | 12/1986 | Fujita | B60G 3/01 280/124.103 |
| 4,657,271 A | 4/1987 | Salmon | |
| 4,659,106 A | 4/1987 | Fujita et al. | |
| 4,685,690 A * | 8/1987 | Fujita | B60G 21/007 280/124.103 |
| 4,779,893 A | 10/1988 | Juechter | |
| 4,887,829 A | 12/1989 | Prince | |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,324,056 A | 6/1994 | Orton | |
| 5,337,847 A | 8/1994 | Woods et al. | |
| 5,347,457 A | 9/1994 | Tanaka et al. | |
| 5,445,443 A | 8/1995 | Hauser et al. | |
| 5,580,089 A | 12/1996 | Kolka | |
| 5,611,555 A | 3/1997 | Vidal | |
| 5,762,351 A | 6/1998 | Soohoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,142,494 A | 11/2000 | Higuchi | |
| 6,149,226 A | 11/2000 | Hoelzel | |
| 6,213,561 B1 | 4/2001 | Witthaus | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,367,824 B1 | 4/2002 | Hayashi | |
| 6,390,505 B1 | 5/2002 | Wilson | |
| 6,425,585 B1 | 7/2002 | Schuekle et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,460,835 B1 | 10/2002 | Hamano et al. | |
| 6,467,783 B1 | 10/2002 | Blondelet et al. | |
| 6,511,078 B2 | 1/2003 | Sebe | |
| 6,554,293 B1 | 4/2003 | Fennel et al. | |
| 6,564,129 B2 | 5/2003 | Badenoch | |
| 6,637,758 B2 * | 10/2003 | Woo | B60G 3/26 280/5.521 |
| 6,654,674 B2 | 11/2003 | Lu et al. | |
| 6,697,726 B2 | 2/2004 | Takagi et al. | |
| 6,702,265 B1 | 3/2004 | Zapletal | |
| 6,722,676 B2 | 4/2004 | Zadok | |
| 6,725,135 B2 | 4/2004 | McKeown et al. | |
| 6,805,362 B1 | 10/2004 | Melcher | |
| 6,817,617 B2 | 11/2004 | Hayashi | |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,131,650 B2 * | 11/2006 | Melcher | B60G 7/006 280/5.5 |
| 7,229,086 B1 | 6/2007 | Rogers | |
| 7,343,997 B1 | 3/2008 | Matthies | |
| 7,389,592 B2 | 6/2008 | Tsuruta et al. | |
| 7,487,985 B1 | 2/2009 | Mighell | |
| 7,568,541 B2 | 8/2009 | Pfeil et al. | |
| 7,571,787 B2 | 8/2009 | Saiki | |
| 7,591,337 B2 | 9/2009 | Suhre et al. | |
| 7,607,695 B2 * | 10/2009 | Moulene | B60G 21/007 280/5.507 |
| 7,631,721 B2 * | 12/2009 | Hobbs | B60G 21/007 180/348 |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,731,210 B2 | 6/2010 | Pedersen | |
| 7,887,070 B2 | 2/2011 | Kirchner | |
| 7,896,360 B2 | 3/2011 | Buma | |
| 7,914,020 B2 * | 3/2011 | Boston | B60G 3/20 280/124.136 |
| 7,946,596 B2 | 5/2011 | Hsu et al. | |
| 7,967,306 B2 * | 6/2011 | Mighell | B62K 5/027 180/210 |
| 8,016,302 B1 | 9/2011 | Reeve | |
| 8,050,820 B2 | 11/2011 | Yanaka et al. | |
| 8,070,172 B2 | 12/2011 | Smith et al. | |
| 8,104,781 B2 | 1/2012 | Gazarek | |
| 8,260,504 B2 | 9/2012 | Tsujii et al. | |
| 8,262,111 B2 * | 9/2012 | Lucas | B60G 3/20 180/210 |
| 8,345,096 B2 | 1/2013 | Ishiyama et al. | |
| 8,641,064 B2 | 2/2014 | Krajekian | |
| 8,651,503 B2 * | 2/2014 | Rhodig | B60G 21/00 280/124.103 |
| 8,818,700 B2 | 8/2014 | Moulene et al. | |
| 8,925,940 B2 | 1/2015 | Michell | |
| 9,045,015 B2 | 6/2015 | Spahl et al. | |
| 9,090,281 B2 | 7/2015 | Spahl et al. | |
| 9,145,168 B2 | 9/2015 | Spahl et al. | |
| 9,216,763 B2 | 12/2015 | Huntzinger | |
| 9,248,857 B2 | 2/2016 | Spahl et al. | |
| 9,283,989 B2 | 3/2016 | Spahl et al. | |
| 9,296,420 B2 | 3/2016 | Sasaki et al. | |
| 9,493,208 B2 | 11/2016 | Sasaki et al. | |
| 2001/0028154 A1 | 10/2001 | Sebe | |
| 2002/0109310 A1 | 8/2002 | Lim et al. | |
| 2002/0171216 A1 | 11/2002 | Deal | |
| 2002/0190494 A1 | 12/2002 | Cocco | |
| 2003/0071430 A1 | 4/2003 | Serra et al. | |
| 2003/0102176 A1 | 6/2003 | Bautista | |
| 2003/0141689 A1 | 7/2003 | Hamy | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0199314 A1 | 10/2004 | Meyers et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | MacIsaac | |
| 2006/0049599 A1 | 3/2006 | Lehane | |
| 2006/0091636 A1 | 5/2006 | Shelton | |
| 2006/0151982 A1 | 7/2006 | Mills | |
| 2006/0170171 A1 | 8/2006 | Pedersen | |
| 2006/0180372 A1 | 8/2006 | Mercier et al. | |
| 2006/0220331 A1 | 10/2006 | Schafer et al. | |
| 2006/0226611 A1 | 10/2006 | Xiao et al. | |
| 2006/0249919 A1 | 11/2006 | Suzuki et al. | |
| 2006/0276944 A1 | 12/2006 | Yasui et al. | |
| 2007/0029751 A1 | 2/2007 | Marcacci | |
| 2007/0075517 A1 | 4/2007 | Suhre et al. | |
| 2007/0078581 A1 | 4/2007 | Nenninger et al. | |
| 2007/0126199 A1 | 6/2007 | Peng et al. | |
| 2007/0151780 A1 | 7/2007 | Tonoli et al. | |
| 2007/0182110 A1 | 8/2007 | Urababa | |
| 2007/0182120 A1 | 8/2007 | Tonoli et al. | |
| 2007/0193803 A1 | 8/2007 | Geiser | |
| 2007/0193815 A1 | 8/2007 | Hobbs | |
| 2007/0228675 A1 | 10/2007 | Tonoli et al. | |

(56) References Cited

U.S. PATENT DOCUMENTS

| | | |
|---|---|---|
| 2007/0241522 A1 | 10/2007 | Tsai |
| 2008/0001377 A1 | 1/2008 | Rogic |
| 2008/0012262 A1 | 1/2008 | Carabelli et al. |
| 2008/0033612 A1 | 2/2008 | Raab |
| 2008/0100018 A1 | 5/2008 | Dieziger |
| 2008/0114509 A1 | 5/2008 | Inoue et al. |
| 2008/0115994 A1 | 5/2008 | Martini |
| 2008/0135320 A1 | 6/2008 | Matthies |
| 2008/0164085 A1 | 7/2008 | Cecinini |
| 2008/0197597 A1 | 8/2008 | Moulene et al. |
| 2008/0197599 A1 | 8/2008 | Comstock et al. |
| 2008/0223634 A1 | 9/2008 | Yamamoto et al. |
| 2008/0227365 A1 | 9/2008 | Lo |
| 2008/0238005 A1 | 10/2008 | James |
| 2008/0255726 A1 | 10/2008 | Fischlein et al. |
| 2008/0258416 A1 | 10/2008 | Wilcox |
| 2008/0272562 A1 | 11/2008 | Sabelstrom et al. |
| 2009/0026719 A1 | 1/2009 | Koch et al. |
| 2009/0085311 A1 | 4/2009 | Kim et al. |
| 2009/0105906 A1 | 4/2009 | Hackney et al. |
| 2009/0108555 A1 | 4/2009 | Wilcox |
| 2009/0171530 A1 | 7/2009 | Bousfield |
| 2009/0194961 A1* | 8/2009 | Dieziger .......... B60G 3/20 280/124.103 |
| 2009/0194965 A1* | 8/2009 | Boston .............. B60G 3/20 280/124.136 |
| 2009/0197731 A1 | 8/2009 | Kobler |
| 2009/0289437 A1 | 11/2009 | Steinhilber |
| 2009/0299565 A1 | 12/2009 | Hara et al. |
| 2009/0312908 A1 | 12/2009 | Van Den Brink |
| 2009/0314566 A1 | 12/2009 | Rust |
| 2009/0315282 A1 | 12/2009 | Kirchner |
| 2010/0025944 A1 | 2/2010 | Hara et al. |
| 2010/0030441 A1 | 2/2010 | Kosaka |
| 2010/0032914 A1 | 2/2010 | Hara et al. |
| 2010/0032915 A1 | 2/2010 | Hsu et al. |
| 2010/0044977 A1 | 2/2010 | Hughes et al. |
| 2010/0044979 A1 | 2/2010 | Haeusler et al. |
| 2010/0152987 A1 | 6/2010 | Gorai |
| 2010/0219600 A1* | 9/2010 | Dada .............. B60G 3/26 280/124.127 |
| 2011/0006498 A1 | 1/2011 | Mercier |
| 2011/0095494 A1 | 4/2011 | White |
| 2011/0148052 A1 | 6/2011 | Quemere |
| 2011/0215544 A1 | 9/2011 | Rhodig |
| 2011/0254238 A1 | 10/2011 | Kanou |
| 2012/0098225 A1 | 4/2012 | Lucas |
| 2012/0248717 A1 | 10/2012 | Tsujii et al. |
| 2013/0062133 A1 | 3/2013 | Budweil |
| 2013/0068550 A1 | 3/2013 | Gale |
| 2013/0127131 A1 | 5/2013 | Michel |
| 2013/0153311 A1 | 6/2013 | Huntzinger |
| 2013/0168934 A1 | 7/2013 | Krajekian |
| 2014/0252730 A1 | 9/2014 | Spahl et al. |
| 2014/0252731 A1 | 9/2014 | Spahl et al. |
| 2014/0252732 A1 | 9/2014 | Spahl et al. |
| 2014/0252733 A1 | 9/2014 | Spahl et al. |
| 2014/0252734 A1 | 9/2014 | Spahl et al. |
| 2014/0312580 A1 | 10/2014 | Gale |
| 2014/0346753 A1 | 11/2014 | Huang et al. |
| 2014/0353937 A1 | 12/2014 | Girelli Consolaro |
| 2014/0365078 A1 | 12/2014 | Gerecke et al. |
| 2015/0045171 A1 | 2/2015 | Schimpf et al. |
| 2015/0094909 A1 | 4/2015 | Illg |
| 2016/0009180 A1 | 1/2016 | Barrass |
| 2016/0059661 A1 | 3/2016 | Saeger et al. |
| 2016/0059923 A1 | 3/2016 | Simon et al. |
| 2016/0243918 A1 | 8/2016 | Spahl et al. |
| 2016/0244094 A1 | 8/2016 | Spahl et al. |

FOREIGN PATENT DOCUMENTS

| | | |
|---|---|---|
| DE | 1937578 U | 1/1963 |
| DE | 6801096 U | 11/1967 |
| DE | 4035128 A1 | 6/1992 |
| DE | 4135585 A1 | 5/1993 |
| DE | 4236328 C1 | 9/1993 |
| DE | 4315017 C1 | 9/1994 |
| DE | 19621947 C1 | 10/1997 |
| DE | 19735912 A1 | 3/1998 |
| DE | 19717418 C1 | 10/1998 |
| DE | 19800292 A1 | 6/1999 |
| DE | 19848294 A1 | 10/1999 |
| DE | 19838328 C1 | 12/1999 |
| DE | 19846275 A1 | 12/1999 |
| DE | 19831162 A1 | 7/2000 |
| DE | 10251946 B3 | 3/2004 |
| DE | 10349655 A1 | 6/2005 |
| DE | 102004027202 A1 | 10/2005 |
| DE | 102004058523 A1 | 6/2006 |
| DE | 102007006546 A1 | 8/2007 |
| DE | 112006002581 T5 | 9/2008 |
| DE | 102007024769 A1 | 11/2008 |
| DE | 102008046588 A1 | 3/2010 |
| DE | 102009042662 A1 | 3/2011 |
| DE | 102010000884 A1 | 7/2011 |
| DE | 102010000886 A1 | 7/2011 |
| DE | 102010055947 A1 | 8/2011 |
| DE | 102010041404 A1 | 3/2012 |
| DE | 102010046317 A1 | 3/2012 |
| DE | 102012217416 A1 | 3/2014 |
| EP | 0592377 A1 | 4/1994 |
| EP | 0606191 A1 | 7/1994 |
| EP | 0626307 A1 | 11/1994 |
| EP | 0658453 A2 | 6/1995 |
| EP | 1030790 A1 | 8/2000 |
| EP | 1142779 A2 | 10/2001 |
| EP | 1153773 A2 | 11/2001 |
| EP | 1155950 A2 | 11/2001 |
| EP | 1180476 A1 | 2/2002 |
| EP | 1228905 A2 | 8/2002 |
| EP | 1346907 A2 | 9/2003 |
| EP | 1348617 A1 | 10/2003 |
| EP | 1419909 A2 | 5/2004 |
| EP | 1539563 A1 | 6/2005 |
| EP | 1600313 A1 | 11/2005 |
| EP | 1630081 A1 | 3/2006 |
| EP | 1702773 A2 | 9/2006 |
| EP | 1798081 A1 | 6/2007 |
| EP | 1872981 A1 | 1/2008 |
| EP | 1773609 B1 | 3/2008 |
| EP | 1944228 A1 | 7/2008 |
| EP | 2030814 A2 | 3/2009 |
| EP | 2077223 A1 | 7/2009 |
| EP | 2199122 A1 | 6/2010 |
| EP | 2213561 A1 | 8/2010 |
| EP | 2475570 B1 | 7/2012 |
| EP | 2712796 A2 | 4/2014 |
| ES | 2284383 A1 | 1/2007 |
| FR | 2663283 A1 | 12/1991 |
| FR | 2768203 A1 | 3/1999 |
| FR | 2858963 A1 | 2/2005 |
| FR | 2872699 A1 | 1/2006 |
| FR | 2927026 A1 | 8/2009 |
| FR | 2937000 A1 | 4/2010 |
| FR | 2946944 A1 | 12/2010 |
| FR | 2961746 A1 | 12/2011 |
| GB | 480191 A | 2/1938 |
| GB | 1157016 A | 7/1969 |
| GB | 2322837 A | 9/1998 |
| GB | 2382334 A | 11/2001 |
| GB | 2374327 A | 10/2002 |
| GB | 2390065 A | 12/2003 |
| GB | 2394701 A | 5/2004 |
| GB | 2444250 A | 6/2008 |
| GB | 2450740 A | 1/2009 |
| GB | 2472180 A | 2/2011 |
| GB | 2476877 A | 7/2011 |
| GB | 2492757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |

(56) References Cited

FOREIGN PATENT DOCUMENTS

| | | |
|---|---|---|
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006248489 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| JP | 2011230727 A | 11/2011 |
| JP | 2012153349 A | 8/2012 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | 2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011005945 A1 | 1/2011 |
| WO | 2011/023862 A1 | 3/2011 |
| WO | 2011029795 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011102108 A1 | 8/2011 |
| WO | 2011/107674 A1 | 9/2011 |
| WO | 2012031150 A2 | 3/2012 |
| WO | 201400969637 A1 | 1/2014 |

OTHER PUBLICATIONS

Nlotice of Allowance dated Sep. 28, 2015 for patented U.S. Appl. No. 14/201,586.
Nlotice of Allowance dated Feb. 3, 2015 for patented U.S. Appl. No. 14/201,602.
Nlotice of Allowance dated May 20, 2015 for patented U.S. Appl. No. 14/201,616.
Non-Final Office Action dated Dec. 19, 2016 from co-pending U.S. Appl. No. 14/839,137.
Final Office Action dated Dec. 30, 2016 from co-pending U.S. Appl. No. 14/630,070.
Final Office Action dated Dec. 30, 2016 from co-pending U.S. Appl. No. 14/630,106.
Non-Final Office Action dated Jan. 5, 2017 from co-pending U.S. Appl. No. 14/842,099.
German Search Report for Application No. 10 2013 203 923.9 dated Oct. 8, 2013.
German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Notice of Allowance dated Mar. 19, 2015 for patented U.S. Appl. No. 14/201,550.
Notice of Allowance dated Sep. 28, 2015 for patented U.S. Appl. No. 14/201,586.
Notice of Allowance dated Feb. 3, 2015 for patented U.S. Appl. No. 14/201,602.
Notice of Allowance dated May 20, 2015 for patented U.S. Appl. No. 14/201,616.
Advisory Action dated Oct. 7, 2015 for co-pending U.S. Appl. No. 14/201,628.
Notice of Allowance dated Nov. 3, 2015 for co-pending U.S. Appl. No. 14/201,628.
Machine translation of German Examination Report dated May 28, 2015 for German Application No. 102014217386.8.
Machine translation of German Examination Report dated Apr. 30, 2015 for German Application No. 102014217246.2.
United Kingdom Search Report for related Application No. GB1520837.4, dated Apr. 13, 2016.
Further United Kingdom Search Report for related Application No. GB1520837.4, dated May 4, 2016.
Non-Final Office Action dated Jun. 27, 2016 from co-pending U.S. Appl. No. 14/630,070.
Non-Final Office Action dated Jun. 27, 2016 from co-pending U.S. Appl. No. 14/630,106.
Office Action dated Nov. 28, 2014 for patented U.S. Appl. No. 14/201,550.
Office Action dated Oct. 10, 2014 for co-pending U.S. Appl. No. 14/201,602.
Office Action dated Sep. 4, 2014 for co-pending U.S. Appl. No. 14/201,628.
Office Action dated Dec. 26, 2014 for co-pending U.S. Appl. No. 14/201,628.
Office Action dated Mar. 11, 2015 for co-pending U.S. Appl. No. 14/201,628.
Office Action dated Jan. 29, 2015 for patented U.S. Appl. No. 14/201,616.
Office Action dated Dec. 19 2014 for co-pending U.S. Appl. No. 14/201,586.
Office Action dated Jun. 1, 2015 for co-pending U.S. Appl. No. 14/201,586.
Office Action dated Jul. 28, 2015 for co-pending U.S. Appl. No. 14/201,628.
Chinese Notification of First Office Action for related Application No. CN201410083008.9, dated Apr. 6, 2017.
Non-Final Office Action dated Apr. 27, 2017 from co-pending U.S. Appl. No. 14/630,070.
Non-Final Office Action dated May 5, 2017 from co-pending U.S. Appl. No. 14/630,106.
Chinese Notification of First Office Action for related Application No. CN201410082053.2, dated Apr. 27, 2017.

(56) References Cited

OTHER PUBLICATIONS

Chinese Notification of First Office Action for related Application No. CN201410081761.4, dated Mar. 29, 2017.
Final Office Action in co-pending U.S. Appl. No. 14/630,106, dated Nov. 15, 2017.
Notice of Allowance in co-pending U.S. Appl. No. 14/630,070, dated Nov. 13, 2017.
Chinese Notification of First Office Action for related Application No. CN201410083843.2, dated Mar. 24, 2017.
Chinese Notification of First Office Action for related Application No. CN201410083467.7, dated Mar. 24, 2017.
Advisory Action dated Mar. 29, 2017 from co-pending U.S. Appl. No. 14/630,070.
Advisory Action dated Mar. 27, 2017 from co-pending U.S. Appl. No. 14/630,106.

* cited by examiner

SUSPENSION SYSTEMS FOR LATERALLY TILTABLE MULTITRACK VEHICLES

TECHNICAL FIELD

The present disclosure relates generally to laterally tiltable multitrack vehicles, such as, for example, motor vehicles, and more particularly to suspensions for laterally tiltable multitrack vehicles.

BACKGROUND

In recent years, interest in motor vehicles with innovative designs has grown in view of the continued expansion of urban areas, the large number of vehicles operating in these areas, and the problems associated therewith, including, for example, traffic jams, parking shortages, and environmental pollution. One solution to such problems (i.e., parking and congestion) is to design vehicles in a manner that permits a plurality of vehicles to share a parking space or a driving lane. In order for such a solution to be feasible, however, such vehicles must be small and, in particular, narrow. Accordingly, vehicles of this type are usually sized to carry no more than one to two persons. Additionally, due to their small size and low weight, such vehicles generally require less engine power output than conventional motor vehicles, which may also reduce the emissions caused by such vehicles without compromising the driving performance of the vehicles.

In recent years, various attempts have therefore been made to develop a laterally tiltable multi-track vehicle, having either three or four wheels, in which the entire vehicle or a part thereof may tilt in toward a rotation center (e.g., a curve bend inner side) in a similar manner to a bicycle or motorcycle. In other words, both the body and wheels of a tiltable vehicle may lean into a curve during cornering such that the wheels stay parallel to the body throughout the curve. Accordingly, like a bicycle or motorcycle, such vehicles are statically in an instable equilibrium and would fall over without any external correction by the driver or another device. Unlike a bicycle or motorcycle, however, in which the vehicle can be easily stabilized by moving the center of gravity of the driver (i.e., via input from the driver), such tiltable vehicles generally require suspensions that can help stabilize the vehicle during cornering, or, for example, on banked roads.

Accordingly, various innovative suspensions have also been developed for laterally tiltable multi-track vehicles. Such suspensions, for example, generally incorporate a balancing device that can create a torque to influence the leaning angle of the vehicle. Additionally, for safety and ride comfort, such suspensions should also provide a spring/damping function between the body of the vehicle and the wheels of the vehicle, similar to the suspension spring/damper elements of a conventional motor vehicle.

It may, therefore, be desirable to provide a suspension system for a laterally tiltable multi-track vehicle that has a compact overall design, and which provides both a balancing function and a spring/damping function. It may be further desirable to provide a suspension system that provides a spring/damping function that does not compromise the system's balancing function.

SUMMARY

In accordance with various exemplary embodiments, a laterally tiltable, multitrack vehicle suspension may include first and second steering knuckles. The suspension may also include a first set of control arms connected to the first steering knuckle and a second set of control arms connected to the second steering knuckle. Each of the first and second sets of control arms may include upper and lower control arms. The suspension may further include a spring/damper element acting between the first and second sets of control arms and a balancer system.

In accordance with various additional exemplary embodiments, a suspension system for a laterally tiltable, multitrack vehicle may include first and second steering knuckles respectively disposed within internal spaces of first and second front wheels of the vehicle. The suspension system may also include a first set of control arms connected to the first steering knuckle and extending between the first steering knuckle and a frame rail of the vehicle, and a second set of control arms connected to the second steering knuckle and extending between the second steering knuckle and a frame rail of the vehicle. Each of the first and second sets of control arms may include an upper control arm connected to an upper end of the respective steering knuckle and a lower control arm connected to a lower end of the respective steering knuckle. The suspension system may further include a spring/damper element acting between the lower control arms and/or the upper control arms of the first and second sets of control arms, and a balancer system configured to create a torque to influence a leaning angle of the vehicle.

In accordance with various further exemplary embodiments, a method of stabilizing a tiltable, multitrack vehicle may include distributing a first load along a first load path during a roll motion of the vehicle. The method may further include distributing a second load along a second load path during a jounce/rebound motion of the vehicle, the second load path differing from the first load path. Distributing the first load may influence a leaning angle of the vehicle, and distributing the second load may enable vertical wheel motion and suppress a resonant vertical motion of the vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a suspension system for a laterally tiltable, multitrack vehicle that has independent leaning and spring/damper functions. In this manner, the suspension system may provide both functions (i.e., leaning and damping), without compromising the performance of either function. For instance, the exemplary embodiments described herein may utilize both a balancing system and a spring/damper element, while providing a separate load path for each function. Various exemplary embodiments described herein, for example, contemplate a suspension system comprising a spring/damper element that is acting between the two lower control arms of the suspension system or between the two upper control arms of the suspension system, thereby allowing the spring/damper element to be compressed/expanded during a jounce/rebound motion of the vehicle (e.g., due to bumps in the road), while only experiencing minor length changes during a roll motion of the vehicle (e.g., during cornering of the vehicle).

Figure 1:
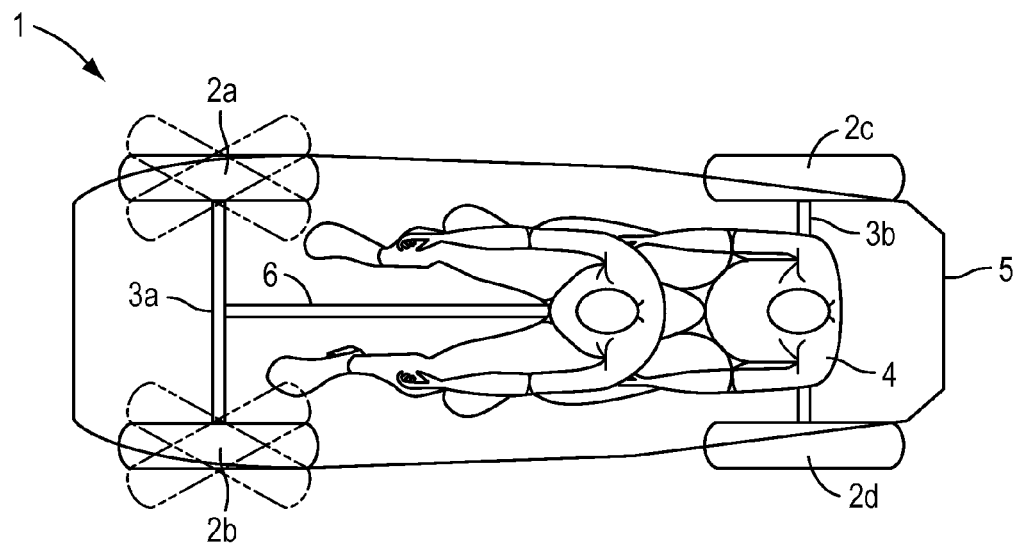
FIG. 1 is a plan view of an exemplary embodiment of a multitrack, laterally tiltable vehicle in accordance with the present disclosure.
Figure 2:
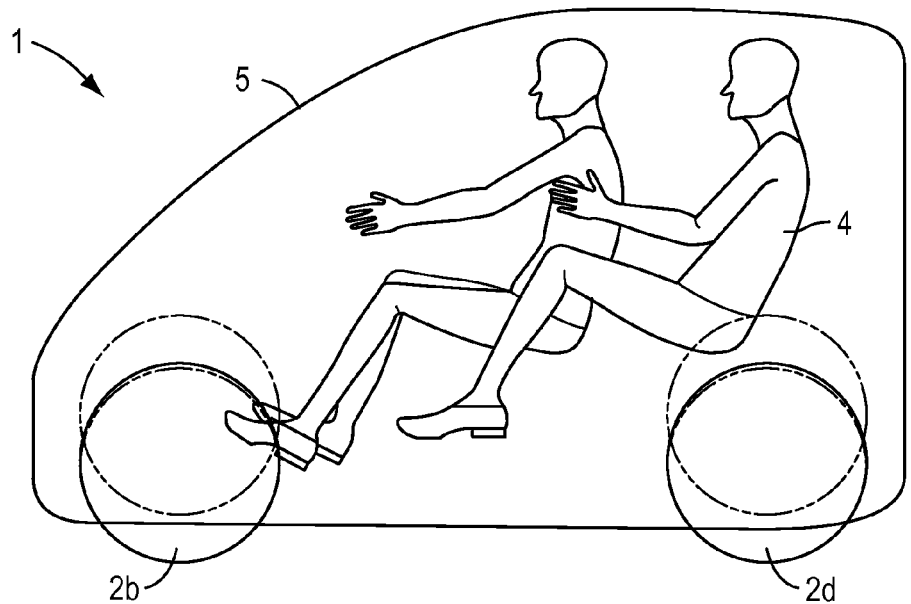
FIG. 2 is a side view of the multitrack, laterally tiltable vehicle of FIG. 1.
Figure 3:
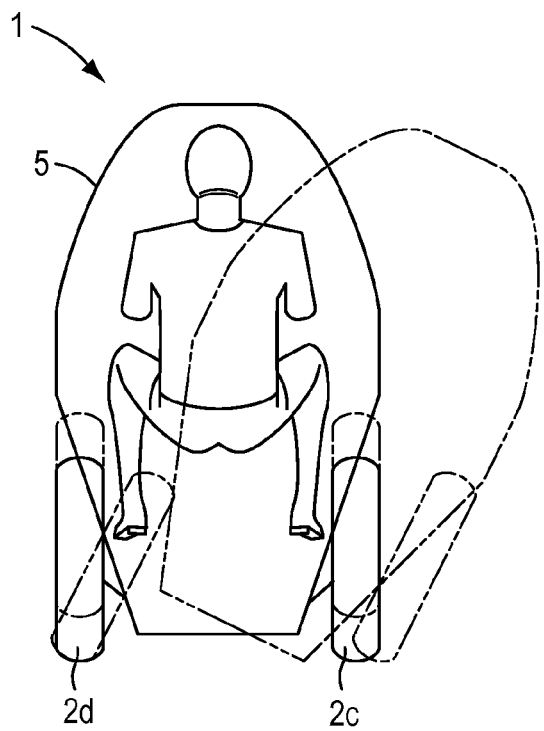
FIG. 3 is a rear view of the multitrack, laterally tiltable vehicle of FIG. 1.

FIGS. 1-3 illustrate an exemplary embodiment of a multitrack, laterally tiltable vehicle in accordance with the present disclosure. As shown in FIGS. 1-3, a vehicle 1 may include four wheels 2a, 2b, 2c, and 2d. Front wheel 2a is mounted on the right side of a front axle 3a of the vehicle 1 and front wheel 2b is mounted on the left side of the front axle 3a. Rear wheel 2c is mounted on the right side of a rear axle 3b of the vehicle 1 and rear wheel 2d is mounted on the left side of the rear axle 3b. In various embodiments, the vehicle 1 is designed for transporting one to two persons or occupants 4. As shown in the exemplary embodiment of FIGS. 1-3, in accordance with various exemplary embodiments, the vehicle 1 may be designed such that the two occupants 4 sit one behind the other in the vehicle 1. In accordance with various additional embodiments, the vehicle 1 may also have a closed body 5 that forms a cabin to protect the occupants 4, for example, from weather, and provides additional protection in the event of an accident.

Those of ordinary skill in the art would understand that the vehicle 1 illustrated in FIGS. 1-3 is exemplary only and intended to illustrate one embodiment of a multitrack, laterally tiltable vehicle in accordance with the present disclosure. Accordingly, multitrack, laterally tiltable vehicles in accordance with the present disclosure may have various body designs, occupant configurations, and numbers and/or configurations of wheels without departing from the scope of the present disclosure and claims. For example, although the vehicle illustrated and described with reference to FIGS. 1-3 includes four wheels 2a, 2b, 2c, and 2d, various additional embodiments of the present disclosure contemplate a vehicle that has only three wheels. Furthermore, those of ordinary skill in the art would understand that the vehicle 1, may have any type of motor or power source known to those of ordinary skill, including, but not limit to, an electric motor, a combustion engine, or a combination thereof (i.e., a hybrid drive).

As shown in the rear view of FIG. 3, both the vehicle body 5 and the wheels 2a, 2b, 2c, and 2d may tilt during the lateral tilting of the vehicle 1. In other words, both the body 5 and the wheels 2a, 2b, 2c, and 2d may lean into a curve during the cornering of the vehicle 1 such that the wheels 2a, 2b, 2c, and 2d stay mainly parallel to the body 5 throughout the curve. Accordingly, as such, vehicle 1 is statically in an instable equilibrium, and may fall over without an external correction. Thus, as above, vehicle 1 requires a suspension system, such as, for example, a front suspension system, that can help stabilize the vehicle during cornering and provide increased safety and ride comfort (i.e., through the damping of vehicle jounce/rebound motion).

Figure 4:
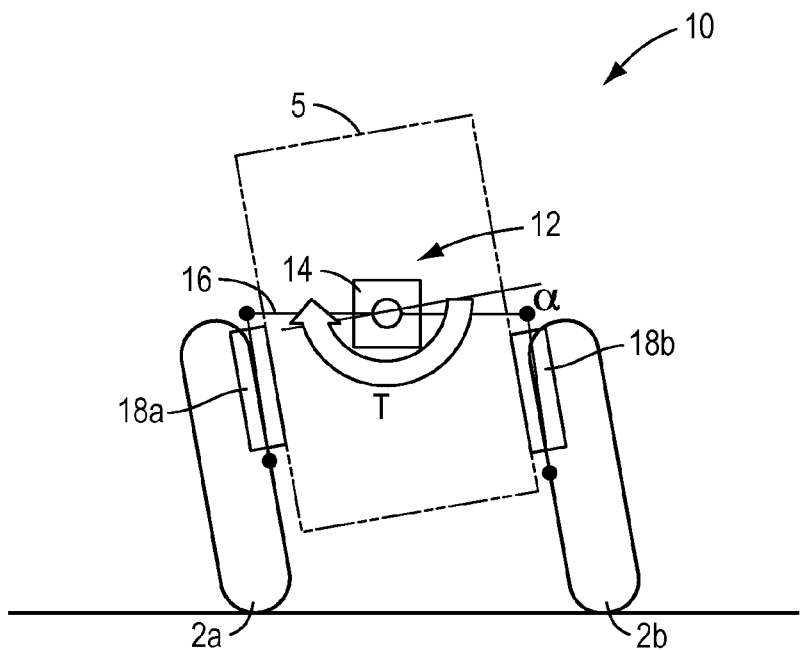
FIG. 4 is a schematic view of a conventional suspension system within the multitrack, laterally tiltable vehicle of FIG. 1.

FIG. 4 illustrates an exemplary arrangement of the components of a conventional front suspension system for a multitrack, laterally tiltable vehicle such as the vehicle 1. The suspension system 10 includes a balancer system 12 that is connected to the front wheels 2a, 2b of the vehicle 1 via, for example, a pair of respective spring/damper elements 18a, 18b and control arms (not shown). The balancer system 12 includes, for example, an actuator (i.e., torque device) 14, which is connected to a balancer control arm 16 and to the body 5 of the vehicle 1. The balancer control arm 16 extends between the control arms of the suspension system 10. In this manner, as would be understood by those of ordinary skill in the art, the balancer system 12 may create a leaning torque T to influence a leaning angle α of the vehicle 1. As shown in FIG. 4, to enable wheel motion and suppress vibration of the vehicle 1, the suspension system 10 may also include a pair of spring/damper elements 18a and 18b, respectively positioned between the balancer control arm 16 and each of the wheels 2a and 2b. In this location, however, the spring/damper elements 18a and 18b may not only create package issues for the vehicle 1, but may also compromise the balancing function by allowing spring/damper movement whenever a torque is created by the actuator 14.

Figure 5:
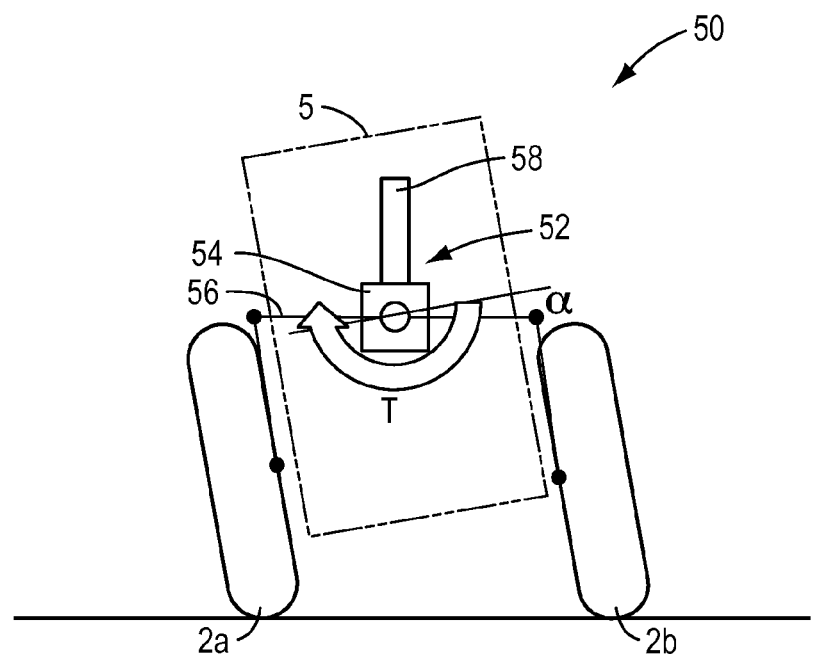
FIG. 5 is a schematic view of another conventional suspension system within the multitrack, laterally tiltable vehicle of FIG. 1.

FIG. 5 illustrates an exemplary arrangement of the components of another conventional front suspension system for the vehicle 1. The suspension system 50 includes a balancer system 52 that is connected to the front wheels 2a, 2b of the vehicle 1 via, for example, a pair of respective control arms (not shown). Similar to the suspension system 12, the balancer system 52 may include an actuator (i.e., torque device) 54, which is connected to a balancer control arm 56 and to the body 5 of the vehicle 1 via a spring/damper element 58. The balancer control arm 56 extends between the control arms of the suspension system 50. In this manner, similar to the balancer system 12, the balancer system 52 may create a torque T to influence a leaning angle α of the vehicle 1. As shown in FIG. 5, to enable vertical wheel motion and suppress vibration of the vehicle 1, the suspension system 50 may also include a spring/damper element 58 that is positioned between the balancer control arm 56 and the body 5 of the vehicle 1. Although positioning the spring/damper element 58 in this location may remedy the package problems associated with the suspension system 10, this configuration still links the balancer control arm 56 to the spring/damper element 58 such that the balancer 56 must also carry the suspension and road loads of the spring/damper element 58. In other words, all the vertical forces that go into the spring/damper element 58 also go into the balancer control arm 56.

Figure 6:
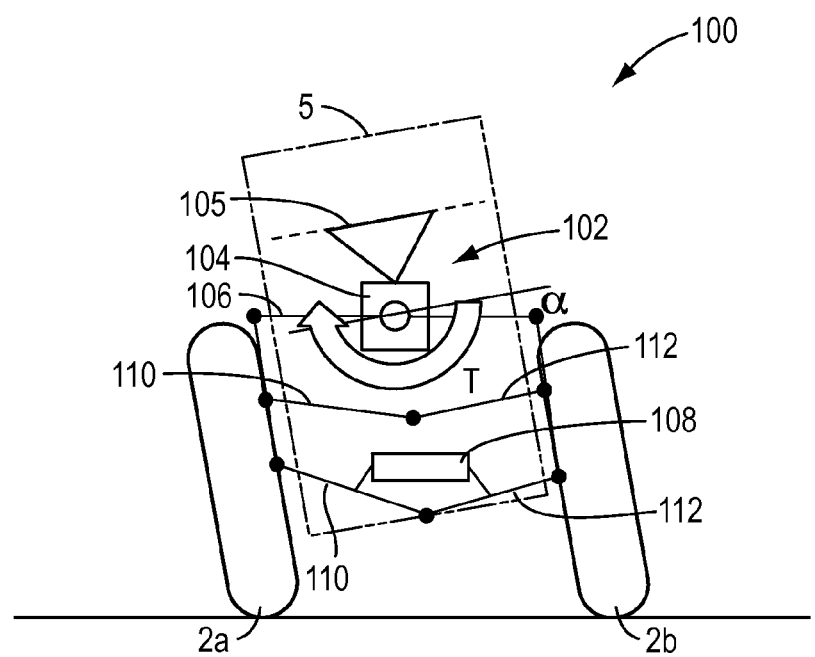
FIG. 6 is a schematic view of an exemplary embodiment of a suspension system in accordance with the present disclosure within the multitrack, laterally tiltable vehicle of FIG. 1.
Figure 7:
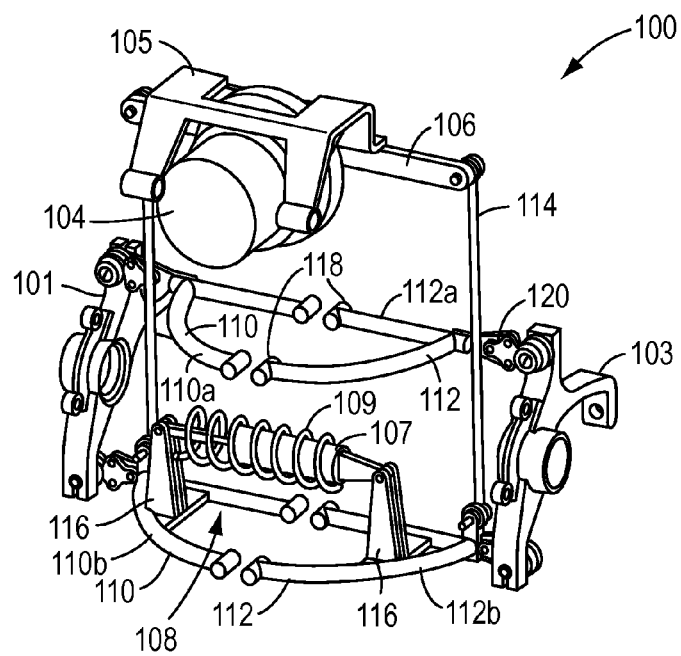
FIG. 7 is a perspective view of the suspension system of FIG. 6.
Figure 8:
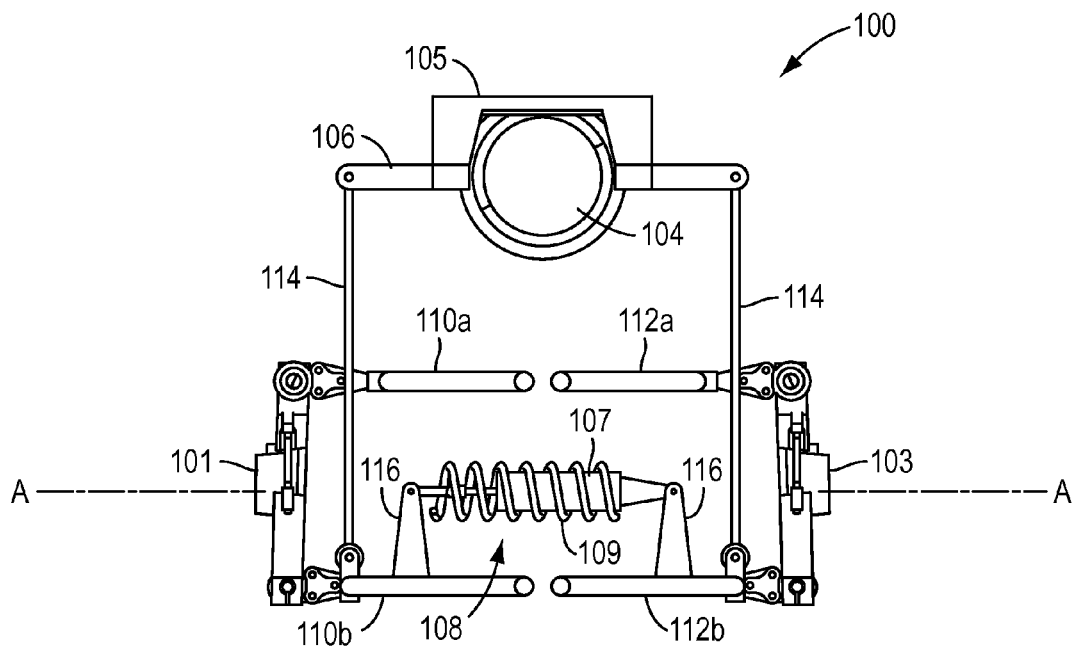
FIG. 8 is a front view of the suspension system of FIG. 6.

FIGS. 6-8 illustrate an exemplary embodiment of a front suspension system 100 for a multitrack, laterally tiltable vehicle, such as, for example, the vehicle 1, in accordance with the present disclosure. Similar to the conventional suspension systems 10, 50 illustrated in FIGS. 4 and 5, the suspension system 100 includes a balancer system 102 that is configured to create a torque T to influence a leaning angle α of the vehicle 1 and a spring/damper element 108 that is configured to suppress the otherwise resonant up and down (i.e., vertical) motions of the vehicle 1. Unlike the systems 10, 50, however, the suspension system 100 provides separate load paths for each of its leaning and spring/damping functions. In accordance with various embodiments, for example, the suspension system 100 includes a spring/damper element 108 that is acting between the control arms of the suspension system 100, for example, between either the two upper control arms or the two lower control arms of the system 100.

In various embodiments of the present disclosure, for example, the front suspension system 100 includes first and second steering knuckles 101, 103 arranged along a common axis A (see, e.g., FIG. 8), and first and second sets of control arms 110, 112 respectively connected to the steering knuckles 101, 103. As illustrated in FIGS. 7 and 8, each of the first and second sets of control arms 110, 112 includes an upper control arm 110a, 112a that is connected to an upper portion of each respective steering knuckle 101, 103 and a lower control arm 110b, 112b that is connected to a lower portion of each respective steering knuckle 101, 103. In accordance with various embodiments, for example, the suspension system 100 may be in the form of a double wishbone suspension (or a double A-arms suspension) and utilize two parallel, wishbone-shaped arms (or A-shaped arms) to locate each wheel 2a, 2b. Thus, in accordance with such embodiments, as shown best perhaps in FIG. 7, each control arm 110a, 110b, 112a, 112b may include two mounting points 118 for mounting the control arm to a frame rail 6 (see FIG. 1) of the vehicle 1 and one joint 120 at the respective knuckle 101, 103.

In accordance with various exemplary embodiments, for example, when the suspension system 100 is in use, the first and second steering knuckles 101, 103 are each respectively disposed within an internal space of the front wheels 2a, 2b. Thus, when the suspension system 100 is in use, the control arms are arranged on either side of the frame rail 6 (which is connected to the body 5) of the vehicle 1, such that the first set of control arms 110 extends between the first steering knuckle 101 and the frame rail 6 and the second set of control arms 112 extends between the second steering knuckle 103 and the frame rail 6.

As used herein, the term "frame rail" refers to any type of vehicle frame rail, including but not limited to, rails that form the main structure of the chassis of the motor vehicle and subframe rails that form frame sections that attach to the chassis.

Those of ordinary skill in the art would understand, however, that the suspension system 100 of FIGS. 6-8 is exemplary only in that the control arms 110a, 110b, 112a, 112b, and the steering knuckles 101, 103 to which the control arms are connected, may have various alternative configurations (i.e., shapes and/or cross-sections), lengths, dimensions, and/or connection/mounting points without departing from the scope of the present disclosure and claims. Furthermore, the control arms 110a, 110b, 112a, 112b, and the steering knuckles 101, 103 may be configured to connect via any method and/or technique known to those of ordinary skill in the art, and are not limited to the flanges and bushings shown in FIGS. 7 and 8. In various embodiments, for example, although not shown, the control arms 110a, 110b, 112a, 112b may be connected to the steering knuckles 101, 103 via a spherical joint.

As above, the suspension system 100 also includes a balancer system 102. As illustrated in FIGS. 7 and 8, in accordance with various embodiments, the balancer system 102 includes a balancer control arm 106 extending in a transverse direction between the knuckles 101, 103, a link 105 connected to the balancer control arm 106, and an actuator 104 connected to the link 105. In various embodiments, for example, the link 105 comprises a triangle link that is configured to connect the balancer control arm 106 to the body 5 of the vehicle 1 and transfer all loads from the body 5 to the balancer control arm 106, while also permitting a jounce/rebound motion of the vehicle 1. In accordance with various embodiments, for example, to transfer loads from the body 5, the triangle link may be configured to rotate around an axle (not shown) as would be understood by those of ordinary skill in the art.

The actuator 104 is also connected to the link 105. In this manner, when the suspension system 100 is in use, the actuator 104 may apply a torque to the balancer arm 106 to rotate the balancer arm 106 (e.g., to influence a leaning angle of the vehicle body 5) without being subjected to the loads from the vehicle body 5. In accordance with various embodiments, for example, the balancer arm 106 may be pivotally connected to each of the lower control arms 110b and 112b via a respective connecting rod 114. Thus, when the suspension system 100 is in use, the rotational forces (i.e., counteracting torque) provided by the actuator 104 may be transmitted to the control arms 110b 112b (and the wheels 2a, 2b) via the connecting rods 114

As used herein, the term "actuator" refers to any type of device or motor that can create a torque, including but not limited to, an electric motor and/or a hydraulic motor. Accordingly, actuators in accordance with the present disclosure may be operated by various sources of energy, including, for example, an electric current, hydraulic fluid pressure, or pneumatic pressure, and may convert that energy into rotational motion.

Also as above, the suspension system 100 additionally includes a spring/damper element 108 acting between the lower control arms 110b, 112b and/or the upper control arms 110a, 112a. As illustrated in FIGS. 7 and 8, in accordance with various exemplary embodiments, the spring/damper element 108 may be connected to each control arm (e.g., 110b, 112b) via a support 116. For example, in various embodiments, the spring/damper element 108 may be horizontally positioned such that the spring/damper element 108 extends between the supports 116 and is parallel to the lower control arms 110b, 112b and/or the upper control arms 110a, 112b. As shown in FIGS. 7 and 8, the spring/damper element 108 may include a shock absorber 107 and a coil spring 109. In this manner, when the suspension system 100 is in use, the spring/damper element 108 is configured to be compressed and expanded during the jounce/rebound motion of the vehicle 1 to suppress what would otherwise become a resonant up and down motion of the vehicle 1.

To verify the expected balancer system load of the suspension systems in accordance with the present disclosure, a front suspension system in accordance with the present disclosure, similar to the suspension system 100 illustrated and described above with reference to FIGS. 6-8, was modeled in a Multibody Dynamics (MBD) simulation software. A conventional front suspension system, similar to the suspension system 50 illustrated and described above with reference to FIG. 5, was also modeled for comparison purposes.

Figure 9:
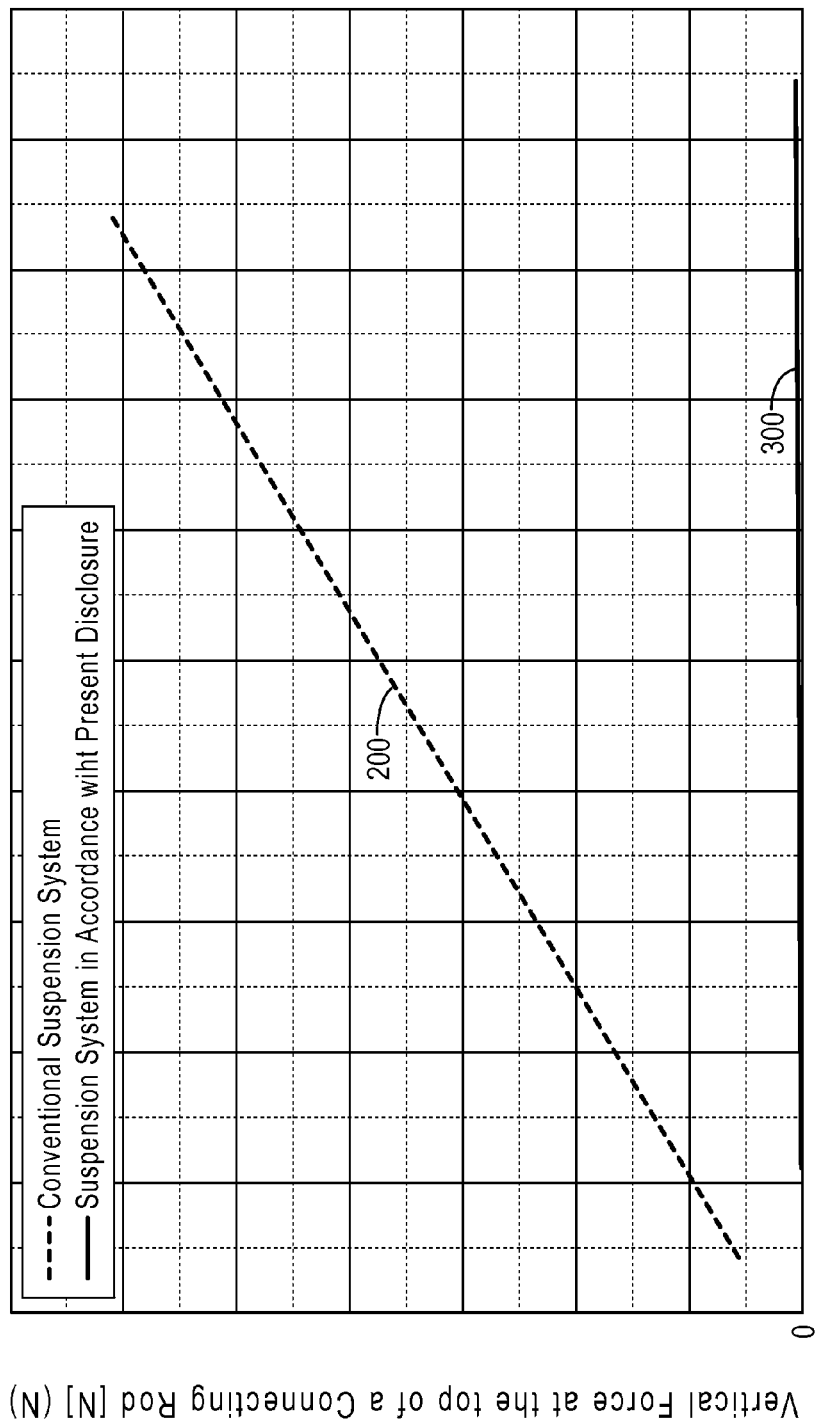
FIG. 9 is a graph comparing balancer system loads of a modeled suspension system in accordance with the present disclosure with a modeled conventional suspension system.

FIG. 9 is a graph comparing the balancer system load of the modeled suspension system in accordance with the present disclosure, during parallel wheel travel, with the modeled conventional suspension system, during parallel wheel travel. As illustrated in FIG. 9, the graph shows the vertical force at the top of a connecting rod (e.g., where the connecting rod 114 meets the balancer control arm 106) as a function of the vertical force at the wheel associated with that connecting rod. As expected, since the configuration of the conventional suspension system links the balancer to the spring/damper element, the balancer must also carry the suspension and road loads of the spring/damper element. In other words, as illustrated by the dashed line 200 in FIG. 9, all the vertical forces at the wheel (which go into the spring/damper element) also go into the balancer control arm, thereby proportionately increasing the vertical force at the top of the connecting rod as the vertical force at the wheel is increased. Conversely, since the configuration of the present disclosure separates the balancer and spring/damper element, the balancer is unaffected by the suspension and road loads of the spring/damper element. Thus, as illustrated by the solid line 300 in FIG. 9, the vertical force at the top of the connecting rod remains close to zero as the vertical force at the wheel is increased.

It was, therefore, determined that the disclosed suspension system for a laterally tiltable multi-track vehicle can effectively provide both a balancing function and a spring/damping function, without compromising either function.

Furthermore, suspension systems in accordance with the present disclosure only utilize one spring/damper element, which is positioned internally to the suspension system (i.e., between the control arms), thereby saving money and preventing packaging issues associated with some of the conventional suspension systems (which utilize multiple spring/damper elements associated with each wheel). Positioning spring/damper elements in such a manner may, therefore, provide for more flexibility in the suspension's design and efficiency in the suspension's packaging.

An exemplary method for stabilizing a tiltable, multitrack vehicle in accordance with an exemplary embodiment of the present disclosure is set forth in the following description with reference to the vehicle 1 of the embodiment of FIGS. 1-3. To stabilize the vehicle 1 during a roll motion of the vehicle 1, a first load may be distributed along a first load path. In various embodiments, for example, distributing the first load may influence a leaning angle of the vehicle 1.

To stabilize the vehicle during a jounce/rebound motion of the vehicle 1, a second load may be distributed along a second load path that differs from the first load path. In various embodiments, for example, distributing the second load may suppress a resonant vertical (i.e., up and down) motion of the vehicle 1.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, and front suspensions, those of ordinary skill in the art would understand that the present teachings as disclosed would work equally well for any type of vehicle having wheels connected to the vehicle via any type of suspension system.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an actuator" includes two or more different actuators. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A suspension system for a laterally tiltable, multitrack vehicle, comprising:
   first and second steering knuckles;
   a first set of control arms connected to the first steering knuckle;
   a second set of control arms connected to the second steering knuckle, each of the first and second sets of control arms comprising upper and lower control arms, wherein the upper control arm of each set is parallel to the lower control arm of each set;
   a spring/damper element extending between and connected to each of the lower control arms and/or each of the upper control arms of the first and second sets of control arms; and
   a balancer system,
   wherein the balancer system is configured to provide a first load path for torque and the spring/damper element is configured to provide a second load path, which differs from the first load path, for suspension and road loads.

2. The suspension system of claim 1, wherein the first and second steering knuckles are each configured to be disposed within an internal space defined by a front wheel of the vehicle.

3. The suspension system of claim 1, wherein the upper control arm of each set is parallel to the lower control arm of each set.

4. The suspension system of claim 1, wherein the upper and lower control arms each comprise an A-arm.

5. The suspension system of claim 1, wherein the upper and lower control arms are each configured to be connected to a frame rail of the vehicle.

6. The suspension system of claim 1, wherein the spring/damper element comprises a shock absorber and a coil spring.

7. The suspension system of claim 1, wherein the balancer system is connected to each of the lower control arms.

8. The suspension system of claim 1, wherein the balancer system is configured to create the torque to influence a leaning angle of the vehicle when the suspension system is in use.

9. The suspension system of claim 1, wherein the balancer system comprises a balancer control arm, a link connected to the balancer control arm, and an actuator attached to the link.

10. The suspension system of claim 9, wherein the link is configured to connect the balancer control arm to a body of the vehicle.

11. The suspension system of claim 10, wherein, when the suspension system is in use, the link is configured to transfer loads from the body of the vehicle to the balancer control arm and permit a jounce/rebound motion of the vehicle.

12. The suspension system of claim 11, wherein, when the suspension system is in use, the spring/damper element is configured to be compressed and expanded during the jounce/rebound motion.

13. A suspension system for a laterally tiltable, multitrack vehicle, comprising:
first and second steering knuckles respectively disposed within internal spaces of first and second front wheels of the vehicle;
a first set of control arms connected to the first steering knuckle and extending between the first steering knuckle and a frame rail of the vehicle;
a second set of control arms connected to the second steering knuckle and extending between the second steering knuckle and a frame rail of the vehicle, wherein each of the first and second sets of control arms comprises an upper control arm connected to an upper end of the respective steering knuckle and a lower control arm connected to a lower end of the respective steering knuckle;
a spring/damper element extending between and connected to each of the lower control arms and/or each of the upper control arms of the first and second sets of control arms, wherein the spring/damper element is parallel to the lower control arms and/or the upper control arms; and
a balancer system configured to create a torque to influence a leaning angle of the vehicle,
wherein the balancer system is configured to provide a first load path for the torque and the spring/damper element is configured to provide a second load path, which differs from the first load path, for suspension and road loads.

14. The suspension system of claim 13, wherein the upper control arm of each set is parallel to the lower control arm of each set.

15. The suspension system of claim 13, wherein the balancer system comprises a balancer control arm, a link connected to the balancer control arm, and an actuator attached to the link.

16. The suspension system of claim 15, wherein the link connects the balancer control arm to a body of the vehicle.

17. The suspension system of claim 16, wherein the link is configured to transfer loads from the body of the vehicle to the balancer control arm and permit a jounce/rebound motion of the vehicle.

18. The suspension system of claim 17, wherein the spring/damper element is configured to be compressed and expanded during the jounce/rebound motion.

19. A method of stabilizing a tiltable, multitrack vehicle, the method comprising:
distributing a first load along a first load path during a roll motion of the vehicle; and
distributing a second load along a second load path during a jounce/rebound motion of the vehicle, the second load path differing from the first load path,
wherein distributing the first load influences a leaning angle of the vehicle, and wherein distributing the second load enables vertical wheel motion and suppresses a resonant vertical motion of the vehicle.

20. The suspension system of claim 1, wherein the spring/damper element is connected to each of the lower control arms and/or each of the upper control arms via a support.

21. The method of claim 19, wherein distributing the first load along the first load path comprises distributing the first load along a balancer system.

22. The method of claim 19, wherein distributing the second load along the second load path comprises distributing the second load along a spring/damper element.

23. The suspension system of claim 1, wherein the spring/damper element is parallel to the lower control arms and/or the upper control arms.

* * * * *